United States Patent [19]
Müller et al.

[11] Patent Number: 5,898,049
[45] Date of Patent: Apr. 27, 1999

[54] BIODEGRADABLE AND COMPOSTABLE SHAPED BODIES

[75] Inventors: Hanns-Peter Müller, Odenthal; Harro Träubel, Leverkusen; Rainhard Koch, Köln, all of Germany

[73] Assignee: Bayer Aktiengesellschaft, Leverkusen, Germany

[21] Appl. No.: 08/960,682

[22] Filed: Oct. 30, 1997

[30] Foreign Application Priority Data

Nov. 6, 1996 [DE] Germany .................. 196 45 663

[51] Int. Cl.⁶ .............. D21H 19/24; C08J 5/18; C08G 18/08; C08G 18/42
[52] U.S. Cl. .................. 525/54.3; 525/180
[58] Field of Search .................. 525/180, 54.3

[56] References Cited

U.S. PATENT DOCUMENTS

| | | | |
|---|---|---|---|
| 3,983,291 | 9/1976 | Chang | 428/290 |
| 4,237,264 | 12/1980 | Noll et al. | 528/67 |
| 5,310,782 | 5/1994 | Takiyama et al. | 524/706 |
| 5,496,909 | 3/1996 | Mühlfeld et al. | 528/76 |

FOREIGN PATENT DOCUMENTS

| | | |
|---|---|---|
| 0 593 975 A1 | 4/1994 | European Pat. Off. . |
| 2 103 036 | 4/1972 | France . |
| 195 17 185 A1 | 11/1996 | Germany . |
| 1 336 050 | 7/1971 | United Kingdom . |

OTHER PUBLICATIONS

T. Jopski, Kunststoffe 83, (1993), 10, pp. 748–750.
H. Träubel, "Polyurethane Dispersions in Leather Production", J. Soc. Leather Tech. & Chem., 1990, No. 1 pp. 7–9.

*Primary Examiner*—Nathan M. Nutter
*Attorney, Agent, or Firm*—Joseph C. Gil

[57] ABSTRACT

The use of dispersions of urea group-containing polyurethanes based on selected starting materials and crosslinkers leads to the production of fully biodegradable shaped bodies.

10 Claims, No Drawings

BIODEGRADABLE AND COMPOSTABLE SHAPED BODIES

The earlier German Patent Application 195 17 185.3 (=PCT Patent application WO 96/1780) relates to the use of aqueous dispersions of selected polyurethanes containing urea groups for the production of biodegradable and compostable shaped bodies, including sheet structures based on cellulosic materials.

The present invention relates to the use of aqueous dispersions of urea group-containing polyurethanes and crosslinkers for producing biodegradable and compostable shaped bodies including sheet structures, preferably those based on cellulosic materials. The invention further relates to composite materials comprising cellulosic natural materials, biodegradable, urea group-containing polyurethanes and crosslinkers. Hereinafter, the term "polyurethane" also includes polyurethane-ureas.

Fully biodegradable and compostable materials (BDM) will in the future acquire ever greater economic and technical importance (T. Jopski, Kunststoffe 83 (1993), 10). The major challenge is to produce plastics which have the necessary performance capability yet degrade under the stimulation of a biologically active environment. The initiating factor may be microbiological, enzymatic, hydrolytic, light-initiated or oxidative degradation at a specific site in the main chain of the polymer. All degradation products must be safe, non-toxic and non-accumulable in nature, i.e. must be subject to complete microbial degradation. To date, three general categories of BDMs have become known: polyesters, plastics based on naturally occurring polymers, and other degradable plastics, e.g. polyvinyl alcohol. The polyesters include polylactic acid, polyhydroxybutyrate and polyhydroxyvalerate, polycaprolactone and high molecular weight aliphatic polyesters (EP-A 572 256). In order to obtain sufficiently high molecular weights, the polyesters specified in EP-A 572 256 are extended with organic diisocyanates to form the end product. The use of thermoplastic polyester-urethanes as compostable plastics is described in EP-A 593 975. Thermoplastically processable and biodegradable polyesteramides are the subject matter of EP-A 641 817 (U.S. Pat. No. 5,644,020).

Biodegradable thermoplastic polyurethane filaments are described in German Patent Specification 4 319 439 (U.S. Pat. No. 5,496,909). The thermoplastically processable polyurethanes are linear, have difunctional polyester diols and difunctional polyethylene glycols built into the polymer chain and are built up using hexamethylene diisocyanate and butanediol or hexanediol as chain extenders (Examples 1 to 3, German Patent Specification 4 319 439).

Biodegradability is thus an important parameter for the abovementioned composite materials. On the other hand, the corresponding products should also have the appropriate properties. These properties play an important role in the production of the material, its further processing, its use and its disposal. For packaging material, it may be mentioned, for example, that the material should be able to be processed on conventional equipment, preferably without rollers or other machine parts being contaminated. If bags, pouches, beakers, etc. are to be produced from a material produced in this way, then the material has to be able to be adhesively bonded. Products packaged therein have to be able, if appropriate, to be stored so as to exclude water or air and/or seal in the aroma. Finally, the material has to be able to be disposed of without problems.

Degradable shaped bodies or sheet structures of composite materials comprising urea group-containing polyurethanes and crosslinkers have not hitherto been disclosed. The use according to the invention, as described in more detail below, of aqueous dispersions of urea group-containing polyurethanes and crosslinkers and of specific additives provides a simple route to such sheet-structures and/or shaped bodies.

The invention provides for the use of aqueous dispersions of urea group-containing polyurethanes for producing fully biodegradable shaped bodies, including sheet structures based on cellulosic substrates, from A. from 0.2 to 50 parts by weight, preferably from 0.5 to 10 parts by weight, of polyurethane dispersion (solids), B. 100 parts by weight of biodegradable naturally occurring material and/or synthetic product and C. from 0.1 to 20% by weight of crosslinker, based on A (solids), wherein the water-dispersed, urea group-containing polyurethanes which are used are reaction products obtainable by known methods, observing a ratio of equivalents of isocyanate groups to groups which are reactive toward isocyanate groups of from 1:1 to 2:1, from a) a diisocyanate component comprising
  a1) hexamethylene diisocyanate or
  a2) mixtures of hexamethylene diisocyanate containing a total of up to 60% by weight, based on mixture a2), of 1-isocyanato-3,3,5-trimethyl-5-isocyanatomethyl-cyclohexane and/or 4,4'-diisocyanatodicyclohexylmethane and/or 1-methyl-2,4(6)-diisocyanatocyclohexane, and b) a diol component comprising
  b1) at least one polyester diol having a number average molecular weight of from 500 to 10,000 derived from (i) adipic acid and/or succinic acid and (ii) at least one alkanediol having from 2 to 6 carbon atoms or
  b2) a mixture of such polyester diols containing up to 32% by weight, based on the total weight of the component b), of alkanediols which have from 2 to 6 carbon atoms and may contain ether groups, c) a diamine component in an amount of from 2 to 50 equivalent-%, based on the total amount of the isocyanate-reactive groups present in the components b) and c), comprising
  c1) diaminosulfonates of the formula

$H_2N\ (-CH_2)_n-NH(-CH_2)_m-SO_3Me$ or
  c2) mixtures of diaminosulfonates c1) with up to 90% by weight, based on the total weight of the component c), of ethylenediamine, if desired d) hydrophilic polyether alcohols of the formula

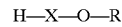

$H-X-O-R$ in an amount of up to 10% by weight, based on the sum of the components b), c) and d) and, if desired, e) water, which is not included in the calculation of the ratio of equivalents of isocyanate groups to groups which are reactive toward isocyanate groups,
where, in the above formulae,
m and n represent, independently of one another, numbers from 2 to 6,
Me represents potassium or sodium,
R represents a monovalent hydrocarbon radical having from 1 to 12 carbon atoms and
X is a polyalkylene oxide chain having a number average molecular weight range from 88 to 4,000, at least 40 mol % of whose alkylene oxide units are ethylene oxide units and the remainder are propylene oxide units.

The invention further provides composite materials comprising cellulosic, naturally occurring materials, the above-defined biodegradable urea group-containing polyurethanes and crosslinkers.

Aqueous dispersions of urea group-containing polyurethanes having a similar or comparable constitution to the polyurethanes of the invention are already known from German Offenlegungsschrift 2 035 732 or 2 651 506. However, these prior publications make no reference to the possibility of producing biodegradable and compostable shaped bodies based on crosslinked polyurethane.

The term "shaped bodies" used in the context of the invention is intended to include sheet structures such as, in particular, coated and possibly multilayer composite materials.

The shaped bodies obtainable according to the invention are fully biodegradable. For the purposes of the invention, this means that test films which have a thickness of from 0.05 to 0.5 mm and have been produced, for example, by drying a dispersion to be used according to the invention or a ready-to-use mixture thereof onto a substrate or by thermoplastic shaping of granules produced from shaped bodies according to the invention pass the film composting test described below at least as well as a corresponding cellulose film. This complete biodegradability also, of course, results in a satisfactory compostability of the final articles and the shaped bodies.

The term "aqueous dispersion" used in the context of the invention is intended to include aqueous solutions which may exist when the concentration of hydrophilic centers in the polyurethanes containing urea groups is sufficiently high to ensure solubility in water. The dispersions to be used according to the invention are often aqueous systems which comprise both dispersed and dissolved polyurethanes containing urea groups.

To prepare the aqueous dispersions, the abovementioned starting materials a), b), c) and, if desired, d) and/or, if desired, e) are used in the ratios mentioned.

The diisocyanate component a) preferably consists exclusively of hexamethylene diisocyanate.

The diol component b) comprises either b1) at least one polyester diol or b2) a mixture of at least one polyester diol b1) with up to 32% by weight, preferably up to 10% by weight, of at least one alkanediol which has from 2 to 6 carbon atoms and may contain ether groups.

Suitable polyester diols b1) are those having a number average molecular weight (which can be calculated from the hydroxyl group content) of from 500 to 10,000, preferably from 1,000 to 2,500, and based on (i) adipic acid and/or succinic acid and (ii) alkanediols which have from 2 to 6 carbon atoms and may contain ether groups, e.g. ethylene glycol, diethylene glycol, 1,4-butanediol, neopentyl glycol and/or 1,6-hexanediol. Polyester diols which have been prepared using exclusively ethylene glycol and/or 1,4-butanediol as diol are particularly preferred.

The alkanediols which have from 2 to 6 carbon atoms, may contain ether groups and are to be used, if desired, as hydroxyl-containing chain extenders are those of the type just mentioned by way of example for the preparation of polyester diols.

The diamine component c) comprises either c1) diaminosulfonates of the abovementioned general formula or c2) mixtures of such diaminosulfonates with ethylenediamine which is used, if at all, in amounts of up to 90 equivalent-%, preferably up to 70 equivalent-%, based on the isocyanate-reactive amino groups of the component c). Very particularly preferred diaminosulfonates are the potassium or sodium salts of N-(2-aminoethyl)-2-aminoethanesulfonic acid.

The diamine component c) is generally used in an amount of from 1 to 10% by weight, preferably from 2 to 5% by weight, based on the weight of the component b).

The formative component d) which can also be used if desired comprises hydrophilic, monohydric polyether alcohols of the formula

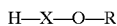

where

R and X are as defined above.

Preference is given to polyether alcohols of this type in which

R represents an aliphatic hydrocarbon radical having from 1 to 4 carbon atoms and X represents a polyalkylene oxide chain having a number average molecular weight range from 500 to 4,000 at least 40 mol %, in particular at least 70 mol % and particularly preferably 100 mol %, of whose alkylene oxide units are ethylene oxide units and the remaining alkylene oxide units are propylene oxide units.

Such monohydric polyether alcohols are prepared by the alkoxylation known per se of suitable initiator molecules R—OH such as methanol, n-butanol, n-hexanol or n-dodecanol, preferably using ethylene oxide and, if desired, propylene oxide in the ratios as specified above for the alkylene oxides. The alkylene oxides mentioned can here be used as a mixture or in succession.

In the process of the invention, the monohydric polyether alcohols d) are used, if at all, in amounts of up to 10% by weight, preferably up to 3% by weight, based on the sum of the components b), c) and d).

A further formative component which may be used in the preparation of the polyurethanes containing urea groups is e) water which can be considered as a reactant particularly when, in the preparation of the polyurethanes, the chain extension reaction of previously prepared NCO prepolymers to be carried out in the last stage is carried out in an aqueous medium, in particular when the diamines c) dissolved in the water are used in equivalent amounts based on the NCO groups of the NCO prepolymers.

Apart from these formative components, it is in principle also possible to use trifunctional compounds in subordinate amounts, for example glycerol or trimethylolpropane, which can either be incorporated in small amounts into the polyester b1) or be used in free form as part of the component b2). The concomitant use of such branch molecules has to be, as a rule, compensated by monofunctional compounds so that, purely arithmetically, linear polymers again result.

The preparation of the polyurethanes containing urea groups from the formative components mentioned by way of example can be carried out by any method. However, preference is given to employing the known prepolymer process, namely by preparing an NCO prepolymer from the components b) and, if desired, d) plus the diisocyanate component a) while observing a ratio of NCO/OH equivalents of from 1.5:1 to 4:1, preferably from 1.8:1 to 2.5:1, and subsequently reacting this prepolymer with the component c) to extend the chains.

In this procedure, the prepolymer is generally prepared in the absence of solvent at temperatures of from 20 to 150° C. and subsequently dissolved in a suitable solvent. Of course, the formation of the prepolymers can also be carried out directly in a solvent. Suitable solvents are, in particular, solvents which are inert toward isocyanate groups and are completely miscible with water. Preference is given to using acetone as solvent.

In the second reaction stage, the prepolymers thus prepared are reacted with the component c) to extend the chains. In this reaction, the ratio of equivalents of isocyanate groups of the prepolymers on the one hand to isocyanate-reactive amino groups of the component c) on the other hand is from 1:1 to 20:1, preferably from 1.2:1 to 4:1. The chain extension reaction can be carried out in solution, preferably in acetone solution, or else in an aqueous medium by combining the solution of the prepolymers in an organic solvent with a solution of the component c) in water while mixing thoroughly. As already indicated, a chain extension reaction may also occur here by reaction of the NCO groups of the prepolymers with the water. In the specified, preferably two-stage, preparation of the polyurethanes containing urea groups, the ratio of equivalents of isocyanate groups and isocyanate-reactive groups in the two reaction stages is selected in the context of the disclosure such that the overall ratio of isocyanate groups to isocyanate-reactive groups of the components b) to d) corresponds to the abovementioned ratio of from 1:1 to 2:1. The water is never included in the calculation of the specified ratios of equivalents.

The chain extension reaction is generally carried out in the temperature range from 20 to 50° C.

It is also possible, but not at all preferred, for the chain extension reaction to be carried out in the melt, i.e. in the absence of solvents and of water (melt dispersion process).

To prepare the dispersions to be used according to the invention, the chain-extended polyurethanes or their solutions in organic solvents, if the chain extension reaction has been carried out in the absence of water, are mixed with the dispersion water, which is followed, if desired, by the distillative removal of at least part of any auxiliary solvent used. If the chain extension reaction has been carried out in an aqueous medium, further water may, if desired, be added for preparing the aqueous dispersions. In this case too, it is of course possible to remove the auxiliary solvent used by distillation if desired.

In general, the total amount of the water employed is calculated such that from 5 to 60% strength by weight (preferably from 20 to 55% strength by weight) dispersions are obtained.

The polyurethane dispersion can be used in the presence of customary auxiliaries. However, particular preference is given to those auxiliaries which are likewise biodegradable. As such auxiliaries, mention may be made, in particular, of those of natural origin: gelatines, protein hydrolysates, guar gum, tragacanth gum, flour, starch, wood flour, cellose powder, etc. Further suitable additives have a mineral basis; although these are not degradable they present no problems in the use of the compost in which they are present and can even serve to improve the soil (pH regulator, etc.). Examples are PCC (precipitated clay), calcium carbonate, dolomite, montmorillonite, talc, kaolin, calcium sulfate, titanium and iron oxide, etc.

The mixtures of the invention are generally applied to the surface of cellulosic materials. In other cases, they can also be incorporated in the body of the material.

Crosslinked polymers are generally not biodegradable. It is therefore extremely surprising that crosslinked polyurethanes are fully degradable in the presence of the cellulosic natural products. Of course, it is not possible to incorporate any amount of crosslinkers into the polymer. In principle, all customary crosslinkers for polyurethane dispersions can be used (see, for example, H. Träubel, "Polyurethane Dispersions in Leather Production", J. Soc. Leather Tech. Tech, 1990, No. 1, p. 7 ff.). Suitable products contain N-methylol, isocyanate, carbodiimide, aziridine and/or epoxide groups. The amount of crosslinkers should be, (based on solid polyurethane) from 0.1 to 20% by weight, preferably less than 10% by weight and particularly preferably less than 5% by weight, in order to ensure good water resistance together with good biodegradability.

With regard to the use of the dispersions, mention may be made, for example, of their use as coating material for any substrates, as adhesive and/or as binder for cellulose for producing packaging films or shaped packaging articles, for containers for fast food, for containers in the garden sector, films for containing plant seeds, etc., viz. cotton and/or hemp or linen articles which can be composted after use, as polymeric binder for wood, wood flour or wood chips, as films in composite materials for producing biodegradable packaging, for producing sanitary articles such as diapers, as binder for producing plant pots, as coatings for paper and for the internal sizing of paper, for producing sausage skins and for producing cosmetic compositions. In addition, it is also possible to produce fully biodegradable and compostable shaped bodies such as flat sheets, injection-molded articles such as flower pots, drinking vessels, table bowls, deep-drawn articles, blister packaging, blown films or bottles. The shaped bodies thus produced have excellent mechanical strengths.

In the following examples, all percentages are by weight, parts are by weight.

EXAMPLES

Products used

| | |
|---|---|
| PERFECTAMYL A 4692 | oxidized, low-viscosity, weakly anionic potato starch from Avebe, Meerbusch |
| ACRAFIX MG | crosslinker based on N-methylolmethylmelamine from Bayer AG, Leverkusen |
| ACRAFIX ML | polyfunctional crosslinker containing N-methylol groups from Bayer AG, Leverkusen |
| MIROX AM | thickener based on polyacrylic acid from Stockhausen GmbH, Krefeld |
| RETAMINOL F | retention composition from Bayer AG, Leverkusen based on an aqueous composition of a cyanamide-polyamine condensation product |

Test methods

| | |
|---|---|
| DRL = | Dry rupture load, measured in accordance with DIN 53 112, part 1 |
| WRL = | Wet rupture load, measured in accordance with DIN 53 112, part 2 |
| Cobb = | Determination of the water absorption in $g/m^2$ by the Cobb method (DIN 53 132) |

Biodegradability: the following methods were used for determining the biodegradability of the polyurethanes described in the examples below:
Film composting test The films to be tested were first dried to constant weight at 80° C. and then clamped into 6×6 cm slide frames. Compost from a composting unit was placed in plastic dishes to a depth of 2 cm and the films were placed therein. The filled boxes were incubated in an incubator for 4 weeks in each case, in succession at 60, 50 and 37° C. Losses of water were regularly determined by means of the weight loss and were made up. During incubation, the pH of the compost was measured once per week. After 4 weeks in each case, a batch was stopped, the films were taken out, cleaned and dried to constant weight at 80° C. Immediately after drying, the weight loss of the film was determined by weighing it again.

For a "poisoned" control, the compost was dried at 105° C. and the water which had been vaporized was then replaced by a 1% strength aqueous $HgCl_2$ solution. Before being introduced into the compost mixture, the films for the poisoned control were placed in the $HgCl_2$ solution, dried and then introduced into the poisoned compost. The control batch was incubated in the same way as the other batches.

A plastic is classified as degradable in accordance with DIN 54 900-1 (draft) if a film produced therefrom disappeared completely in the microbially active batches just the same as the cellulose film used in a parallel test, and was preserved in the poison control.

Headspace test 10 g of thoroughly rotted compost (based on dry weight) from a composting unit were mixed very thoroughly with from 1 to 2 g of polymer. The polymer/compost mixture was subsequently moistened and again mixed thoroughly. The final water content of the polymer/compost mixture should be from about 45 to 55%. The polymer/compost mixture was placed in a one liter flask which could be closed so as to be gastight and from which a gas sample could be taken via a septum. In control batches, the same amount of compost was used without polymer. After introducing the polymer/compost mixture into the flasks, the latter were filled with pure $O_2$ for from 20 to 30 minutes. After gas treatment, the flask was closed so as to be gastight and the water loss occurring during gas treatment was made up by injecting distilled $H_2O$ through the septum. To simulate rotting conditions, the flasks were incubated at 55° C.

At intervals of from one to two weeks, the $CO_2$ formed was determined by means of gas chromatography; after the gas measurement, the gas treatment was carried out again. The percentage degradation can be determined from the amount of $CO_2$ formed and the carbon content of the polymer.

A plastic was classified as degradable in this test if its degradation corresponded in terms of rate and extent to that of cellulose.

Controlled composting test

The controlled composting test was carried out in accordance with DIN 54 900-1 (draft).

Up to 100 g of finely ground polymer material were mixed with 1,000 g of compost (degree of rotting 4) from a composting unit. The mixture was placed in vessels having a volume of 3 l and was treated continuously with air via a gas inlet. The vessels were heated at 58° C. The $CO_2$ concentration in the gas outlet was measured continuously by means of an IR detector, and the flow rate of the gas was also determined. The amount of $CO_2$ formed could be calculated from the two values. The degree of degradation could be determined by correction against a control without polymer.

A plastic was classified as degradable in this test if its degradation corresponded in terms of rate and extent to that of cellulose.

Example 1

83.4 g of a polyester derived from adipic acid, ethanediol and 1,4-butanediol in a weight ratio of ethanediol:butanediol=1.4:1 and having a molecular weight $M_n$ of 2000 and 3 g of a monohydric polyether alcohol having a molecular weight $M_n$ of 2240 and prepared by alkoxylation of n-butanol using a mixture of propylene oxide and ethylene oxide in a molar ratio of PO:EO=1:7.1 are degassed together for 30 minutes at 120° C. under reduced pressure. Under nitrogen, 0.1 g of benzoyl chloride and 13.7 g of hexamethylene diisocyanate are added to the batch in one go. After stirring for 1 hour at 120° C., the NCO content is 2.84%. The prepolymer is dissolved at 50° C. in 300 g of acetone and, at room temperature, a mixture of 4.8 g of a 50% strength aqueous solution of the sodium salt of N-(2-aminoethyl)-2-aminoethanesulfonic acid (AAS salt) and 1.15 g of ethylenediamine and 20 g of water is added. After 15 minutes, 230 g of water are added and the acetone is removed to 60° C. and 140 mbar. The distillation residue comprises 337 g of a fluid, white dispersion containing 30% of polyurethane.

A sample of the dispersion is dried on a glass plate. This gives a clear, tack-free film having an elongation at break of more than 300%. The thickness of the film is 0.25 mm.

The film was completely degraded within 8 weeks in the film composting test. In the headspace test, 85% of the carbon in the test material employed had been converted into $CO_2$ after 90 days.

Example 2

81.5 g of the polyester diol described in Example 1 and 2.9 g of the monohydric polyether alcohol described in Example 1 are degassed together for 30 minutes at 120° C. under reduced pressure. Under nitrogen, 0.1 g of benzoyl chloride and, in one go, the mixture of 6.7 g of hexamethylene diisocyanate and 8.8 g of isophorone diisocyanate are added to the batch. After stirring for 1 hour at 100° C., the NCO content is 3.05%. The prepolymer is dissolved at 50° C. in 300 g of acetone and, at room temperature, while stirring rapidly, a mixture of 4.8 g of a 50% strength aqueous solution of AAS salt and 1.36 g of ethylenediamine and 20 g of water are added. After 15 minutes, 230 g of water are added and the acetone is removed to 50° C. and 120 bar. The distillation residue comprises 362 g of a 29.6% strength, fluid, white dispersion.

A sample of the dispersion is dried on a glass plate to give a 0.25 mm thick, clear film whose elongation at break is more than 300%.

In the film composting test, degradation took place within 3 months.

Example 3

170 g of a polyester diol having a molecular weight $M_n$ of 1700 and derived from adipic acid and a mixture of 1,6-hexanediol and neopentyl glycol in a weight ratio of 1.9:1 are degassed for 60 minutes at 120° C. under reduced pressure. Under nitrogen, 0.2 ml of benzoyl chloride and, in one go, 30.1 g of hexamethylene diisocyanate are added to the batch. After stirring for 30 minutes at 120° C., the NCO content is 3.2%. The prepolymer is dissolved at 50° C. in 500 g of acetone, cooled to room temperature and, while stirring rapidly, a mixture of 9.7 g of a 50% strength aqueous solution of AAS salt and 1.51 g of ethylenediamine and 20 g of water are added to the acetone solution. After stirring for 15 minutes, 300 g of water are added and the acetone is removed to 60° C. and 140 mbar. 505 g of distillation residue are obtained. Diluting with 11 g of water gives a 40% strength, fluid, white polyurethane-urea dispersion.

A sample of the dispersion is diluted with water, poured onto a glass plate and dried. This gives a clear, tack-free film having an elongation at break of more than 200%. The thickness of the film is 0.25 mm.

In the film composting test, degradation took place within 2 months. In the controlled composting test in accordance with DIN test screen part 4 (DIN FNK AA 103.3), 90% conversion into $CO_2$ took place within 55 days. In the headspace test, 85% conversion into $CO_2$ took place within 87 days.

Example 4 (Comparative example)

200 g of a polyester diol having a molecular weight $M_n$ of 2000 and derived from phthalic acid and ethanediol are degassed for 30 minutes at 120° C. under reduced pressure. Under nitrogen, 0.3 ml of benzoyl chloride and, in one go, 30.2 g of hexamethylene diisocyanate are added to the batch. After stirring for 40 minutes at from 120° C. to 140° C., the NCO content is 2.65%. The prepolymer is dissolved at 50° C. in 500 g of acetone and, at room temperature while stirring rapidly, a mixture of 27.4 g of a 50% strength, aqueous solution of AAS salt and 50 g of water is added. After stirring for 10 minutes, 509 g of water are added and the acetone is removed to 50° C. and 140 mbar. 781 g of distillation residue are obtained. Dilution with 28 g of water gives a 30% strength, fluid, white polyurethane-urea dispersion.

A sample of the dispersion is dried on a glass plate to give a clear, tack-free film having a thickness of 0.25 mm.

No degradation was observed in the film composting test.

Use Examples 1–11

In the following experiments, films and also coated papers were produced: (kraft) papers (experiment 1–11) were coated. Amount applied: 30 g/m² (solids), doctor blade.

| Use example No. | 1 | 2 | 3 | 4 | 5 | 6 |
|---|---|---|---|---|---|---|
| Polyurethane dispersion from Example 3 | 100 | 100 | 90 | 75 | 75 | 50 |
| Starch solution, 40% strength, stirred in hot (at 40° C.) | 0 | 0 | 10 | 25 | 75 | 50 |
| ACRAFIX MF Formaldehyde source | 0.8 | 2 | 0.8 | 0.8 | 0.8 | 0.8 |
| MIROX AM Thickener + ammonia | 1.5 | 1.5 | 0 | 0 | 0 | 0 |
| Water | 0 | 0 | 5 | 30 | 15 | |
| Cobb value, 8h | 55 | 67 | 76 | 90 | 81 | 105 |

| Use example No. | 1 | 2 | 3 | 4 | 5 | 6 |
|---|---|---|---|---|---|---|
| Dry rupture load of the coated paper (N) | 138 | 138 | 116 | 148 | 141 | 141 |
| Wet rupture load (N) | 21 | 24.4 | 16.3 | 17.8 | 14.1 | 14.7 |

The mixtures were used to produce 0.2 mm thick films (experiments 1–7) and to coat paper. The crosslinker-containing coatings and films were reacted completely by condensation for 2 minutes at 150° C.

The seven films (not the coated papers, since it is known that cellulose is biodegradable) were examined in the film composting test. For this purpose, the films to be tested are clamped into 6×6 cm slide frames and incubated for 3 months in compost. After 1 or 3 months, the films are taken out and assessed visually for microbial degradation; if possible, the weight loss is also determined. A poisoned control in which the films are incubated under the same conditions is carried out in parallel; bacteria or fungi cannot grow in this control test.

| Film number | 1 month | poisoned control after 3 months |
|---|---|---|
| | Weight loss in percent (%) | |
| 1 | 81.7 | 57.4 |
| 2 | 82.2 | 45.6 |
| 3 | 80.5 | 78.2 |
| 4 | 84.9 | 87.7 |
| 5 | 86.9 | 53.0 |
| 6 | 91.9 | 66.0 |
| 7 | 91.6 | 62.8 |

The values interpreted as follows:

All samples also containing the crosslinkers displayed degradation: this proceeded very rapidly and was largely concluded after only 4 weeks. The poisoned control also showed degradation (albeit less) which was possibly caused by a non-biological hydrolysis of the bonds in the polymer. However, this (abiotic) decomposition of the polymer tended to be less than the actual microbial degradation.

The degradability of the types of material tested in this study is similar to regenerated cellulose film (pure cellulose) or other filly biodegradable polymers such as polycaprolactone.

TABLE

Use examples 12–18
Use of the mixtures according to the invention in the stock
(Amount in % by weight, based on pine/birch sulfate, i.e. on cellulose)

Use in stock (Rapid Köthen)
Pulp: pine/birch sulfate 80:20
Degree of beating: 38° SR
Mass per unit area: about 80 g/m²
Residence time: 5 min
Amount used: 3 g/liter

| Experiment | 1 | 2 | 3 | 4 | 5 | 6 | 7 | 8 | Comp.1 | Comp. 2 |
|---|---|---|---|---|---|---|---|---|---|---|
| Retaminol F | 2.5 | 2.5 | 2.5 | 2.5 | 2.5 | 2.5 | 2.5 | 2.5 | 2.5 | 2.5 |
| 90 parts of dispersion + 10 parts of Perfectamyl A 4692 (40%) + 0.8 part of Acrafix ML | 3 | 10 | | | | | | | | |
| 75 parts of dispersion + 25 parts of Perfectamyl A 4692 (40%) + 0.8 part of Acrafix ML + 5 parts of water | | | 3 | 10 | | | | | | |

TABLE-continued

Use examples 12–18
Use of the mixtures according to the invention in the stock
(Amount in % by weight, based on pine/birch sulfate, i.e. on cellulose)

| | | | | | | | | |
|---|---|---|---|---|---|---|---|---|
| 25 parts of dispersion + 75 parts of Perfectamyl A 4692 (40%) + 0.8 part of Acrafix ML + 30 parts of water | | | | 3 | 10 | | | |
| 50 parts of dispersion + 50 parts of Perfectamyl A 4692 (40%) + 0.8 part of Acrafix ML + 15 parts of water | | | | | | 3 | 10 | |
| 100 parts of dispersion* | | | | | | | 3 | 10 |
| DRL | 81.8 | 79.5 | 88.7 | 84 | 90.5 | 87.9 | 90.9 | 82 | 92.7 |
| WRL | 0.3 | 0.3 | 0.3 | 0.3 | 0.3 | 0.3 | 0.3 | 0.3 | 0.3 |
| Weight per unit area | 86 | 86 | 86 | 85 | 84 | 85 | 85 | 85 | 85 |

*50% strength aqueous polyurethane dispersion as described in Example 3

The results show that use of the products in the stock is not quite as effective as on the surface. However, it can also be shown that the dry rupture load can be significantly increased by use of polyurethane dispersions according to the invention and their mixtures with starch.

We claim:

1. Fully biodegradable shaped bodies prepared from aqueous dispersions of urea group-containing polyurethanes, said polyurethanes comprising
   A. from 0.2 to 50 parts by weight on a solids basis of water dispersed, urea group-containing polyurethanes
   B. 100 parts by weight of biodegradable naturally occurring material and/or synthetic products and
   C. from 0.1 to 20% by weight of crosslinker, based on the solids of A, wherein the water-dispersed, urea group-containing polyurethanes which are used are reaction products obtainable by known methods, using a ratio of equivalents of isocyanate groups to groups which are reactive toward isocyanate groups of from 1:1 to 2:1, from a) a diisocyanate component comprising
   a1) hexamethylene diisocyanate or
   a2) mixtures of hexamethylene diisocyanate containing a total of up to 60% by weight, based on mixture a2), of 1-isocyanato-3,3,5-trimethyl-5-isocyanatomethyl-cyclohexane and/or 4,4'-diisocyanatodicyclohexylmethane and/or 2,4(6)-diisocyanatocyclohexane, and b) a diol component comprising
   b1) at least one polyester diol having a number average molecular weight of from 500 to 10,000 derived from (i) adipic acid and/or succinic acid and (ii) at least one alkanediol having from 2 to 6 carbon atoms or
   b2) a mixture of the polyester diols of b1 containing up to 32% by weight, based on the total weight of the component b), of alkanediols which have from 2 to 6 carbon atoms and optionally which contain ether groups, c) a diamine component in an amount of from 2 to 50 equivalent-%, based on the total amount of the isocyanate-reactive groups present in the components b) and c), comprising
   c1) diaminosulfonates of the formula

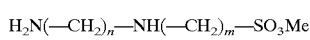

$H_2N-(CH_2)_n-NH-(CH_2)_m-SO_3Me$ or
   c2) mixtures of diaminosulfonates c1) with up to 90% by weight, based on the total weight of the component c), of ethylenediamine, d) optionally hydrophilic polyether alcohols of the formula

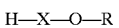

$H-X-O-R$ in an amount of up to 10% by weight, based on the sum of the components b), c) and d) and, e) optionally water, which is not included in the calculation of the ratio of equivalents of isocyanate groups to groups which are reactive toward isocyanate groups, where, in the above formulae,
   m and n represent, independently of one another, numbers from 2 to 6,
   Me represents potassium or sodium,
   R represents a monovalent hydrocarbon radical having from 1 to 12 carbon atoms and
   x is a polyalkylene oxide chain having a number average molecular weight range from 88 to 4,000, at least 40 mol % of whose alkylene oxide units are ethylene oxide units and the remainder are propylene oxide units.

2. Fully biodegradable shaped bodies as claimed in claim 1, wherein the water-dispersed polyurethanes used are prepared in a two-stage reaction by reacting the starting components a), b) and, optionally, d) while maintaining a ratio of NCO/OH equivalents of from 1.5:1 to 4:1 to give an NCO prepolymer and subsequently subjecting this NCO prepolymer to a chain extension reaction with an aqueous solution of the component c).

3. Fully biodegradable shaped bodies as claimed in claim 1, wherein the water-dispersed, urea group-containing polyurethanes used have been prepared using
   as component a), only hexamethylene diisocyanate,
   as component b), only polyester diols based on adipic acid and
   as component c), only c1) the potassium or sodium salts of N-(2-aminoethyl)-2-aminoethanesulfonic acid or c2) mixtures of such salts with ethylenediamine.

4. A composite material comprising natural cellulosic materials, biodegradable urea group-containing polyurethanes and crosslinkers.

5. Aqueous dispersions of urea group-containing polyurethanes for producing fully biodegradable shaped bodies comprising
   A. from 0.2 to 50 parts by weight on a solids basis of water dispersed, urea group-containing polyurethanes
   B. 100 parts by weight of biodegradable naturally occurring material and/or synthetic products and
   C. from 0.1 to 20% by weight of crosslinker, based on the solids of A, wherein the water-dispersed, urea group-containing polyurethanes which are used are reaction products obtainable by known methods, using a ratio of equivalents of isocyanate groups to groups which are reactive toward isocyanate groups of from 1:1 to 2:1, from a) a diisocyanate component comprising
  a1) hexamethylene diisocyanate or
  a2) mixtures of hexamethylene diisocyanate containing a total of up to 60% by weight, based on mixture a2), of 1-isocyanato-3,3,5-trimethyl-5-isocyanatomethyl-cyclohexane and/or 4,4'-diisocyanatodicyclohexyl-methane and/or 1-methyl-2,4(6)-diisocyanatocyclohexane, and b) a diol component comprising
  b1) at least one polyester diol having a number average molecular weight of from 500 to 10,000 derived from (i) adipic acid and/or succinic acid and (ii) at least one alkanediol having from 2 to 6 carbon atoms or
  b2) a mixture of such polyester diols containing up to 32% by weight, based on the total weight of the component b), of alkanediols which have from 2 to 6 carbon atoms and optionally which contain ether groups, c) a diamine component in an amount of from 2 to 50 equivalent-%, based on the total amount of the isocyanate-reactive groups present in the components b) and c), comprising
  c1) diaminosulfonates of the formula $H_2N(-CH_2)_n-NH(-CH_2)_m-SO_3Me$ or
  c2) mixtures of diaminosulfonates c1) with up to 90% by weight, based on the total weight of the component c), of ethylenediamine, d) optionally hydrophilic polyether alcohols of the formula $H-X-O-R$ in an amount of up to 10% by weight, based on the sum of the components b), c) and d) and, e) optionally water, which is not included in the calculation of the ratio of equivalents of isocyanate groups to groups which are reactive toward isocyanate groups, where, in the above formulae,
  m and n represent, independently of one another, numbers from 2 to 6,
  Me represents potassium or sodium,
  R represents a monovalent hydrocarbon radical having from 1 to 12 carbon atoms and
  x is a polyalkylene oxide chain having a number average molecular weight range from 88 to 4,000, at least 40 mol % of whose alkylene oxide units are ethylene oxide units and the remainder are propylene oxide units.

6. Aqueous dispersions as claimed in claim 5, wherein the water-dispersed polyurethanes used are prepared in a two-stage reaction by reacting the starting components a), b) and, optionally, d) while maintaining a ratio of NCO/OH equivalents of from 1.5:1 to 4:1 to give an NCO prepolymer and subsequently subjecting this NCO prepolymer to a chain extension reaction with an aqueous solution of the component c).

7. Aqueous dispersions as claimed in claim 5, wherein the water-dispersed, urea group-containing polyurethanes used have been prepared using
  as component a), only hexamethylene diisocyanate,
  as component b), only polyester diols based on adipic acid and
  as component c), only c1) the potassium or sodium salts of N-(2-aminoethyl)-2-aminoethanesulfonic acid or c2) mixtures of such salts with ethylenediamine.

8. A composite material comprising natural cellulosic materials, biodegradable urea group-containing polyurethanes as claimed in claim 5 and crosslinkers.

9. Fully biodegradable shaped bodies according to claim 1, wherein the fully biodegradable shaped bodies are sheet structures based on cellulosic substrates.

10. Aqueous dispersions of urea group-containing polyurethanes according to claim 5, wherein the fully biodegradable shaped bodies are sheet structures based on cellulosic substrates.

* * * * *